United States Patent
Canobbio et al.

(10) Patent No.: US 10,059,288 B2
(45) Date of Patent: Aug. 28, 2018

(54) SAFETY DEVICE FOR ORIENTING A MOTOR-VEHICLE FRONT WHEEL TRANSVERSALLY TO THE LONGITUDINAL DIRECTION FOLLOWING A COLLISION

(71) Applicant: FCA Italy S.p.A., Turin (IT)

(72) Inventors: Mauro Giacomo Enrico Canobbio, Turin (IT); Luigi Laurino, Turin (IT)

(73) Assignee: FCA Italy S.p.A., Turin (IT)

( * ) Notice: Subject to any disclaimer, the term of this patent is extended or adjusted under 35 U.S.C. 154(b) by 8 days.

(21) Appl. No.: 15/435,382

(22) Filed: Feb. 17, 2017

(65) Prior Publication Data
US 2017/0297519 A1   Oct. 19, 2017

(30) Foreign Application Priority Data

Apr. 18, 2016 (EP) ..................... 16165735

(51) Int. Cl.
*B60R 19/00* (2006.01)
*B62D 21/15* (2006.01)
(Continued)

(52) U.S. Cl.
CPC .............. *B60R 19/00* (2013.01); *B60R 19/26* (2013.01); *B62D 9/00* (2013.01); *B62D 21/152* (2013.01);
(Continued)

(58) Field of Classification Search
CPC ..... B60R 19/00; B60R 21/152; B60R 21/155; B60R 25/082; B60R 2019/005; B60R 2021/0023; B60R 9/00
See application file for complete search history.

(56) References Cited

U.S. PATENT DOCUMENTS

| | | | | |
|---|---|---|---|---|
| 3,881,742 A | * | 5/1975 | Felzer | ..................... B60R 19/00 |
| | | | | 280/784 |
| 6,994,374 B2 | * | 2/2006 | Miyasaka | ................ B60G 7/02 |
| | | | | 280/784 |

(Continued)

FOREIGN PATENT DOCUMENTS

| JP | 2008222037 A | 9/2008 |
|---|---|---|
| JP | 2012166743 A | 9/2012 |

OTHER PUBLICATIONS

European Search Report dated Sep. 29, 2016, for European Application No. 16165735.8, 3 pages.

*Primary Examiner* — Drew J Brown
(74) *Attorney, Agent, or Firm* — RMCK Law Group PLC

(57) ABSTRACT

A safety device is described which is configured to orient a motor-vehicle front wheel transversely to the travel direction, following a collision of the motor-vehicle against a barrier. The device includes a ram member carried by a plate projecting laterally in a cantilever fashion from the motor-vehicle structure forwardly of the front wheel. The ram member is pushed against the front wheel following a collision of the motor-vehicle against the barrier. The ram member has a vertically elongated front portion, for engaging the wheel. With the transverse plate carrying the ram member there is associated a bumper structure located forwardly of the transverse plate and including a bumper element projecting forwardly from the transverse plate, at an intermediate position between the ram member and a connected end of the transverse plate.

8 Claims, 8 Drawing Sheets

Figure 1:
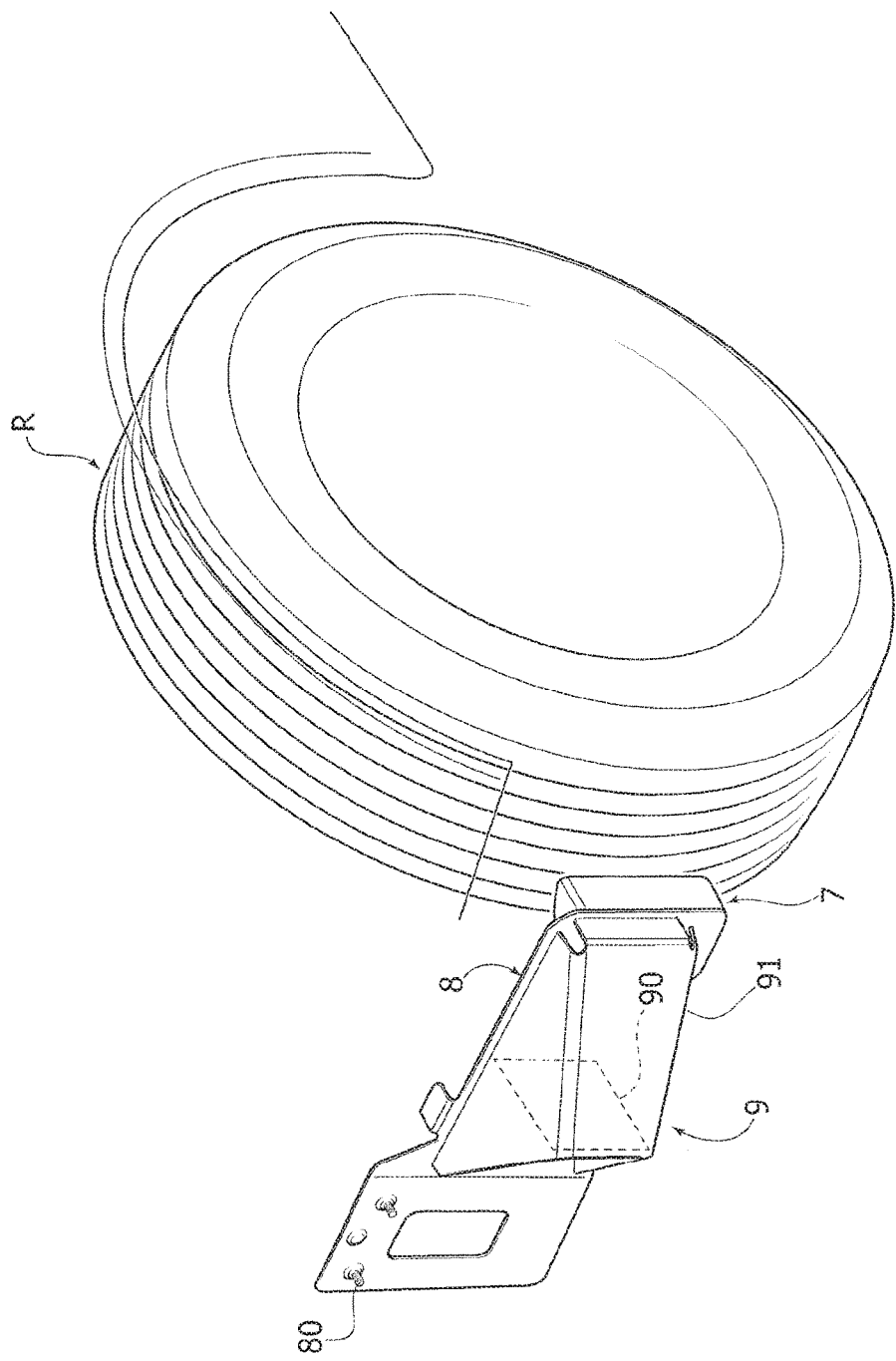

(51) Int. Cl.
*B62D 9/00* (2006.01)
*B62D 25/08* (2006.01)
*B60R 19/26* (2006.01)
*B60R 21/00* (2006.01)

(52) U.S. Cl.
CPC ......... *B62D 21/155* (2013.01); *B62D 25/082* (2013.01); *B60R 2019/005* (2013.01); *B60R 2021/0023* (2013.01)

(56) References Cited

U.S. PATENT DOCUMENTS

| | | | |
|---|---|---|---|
| 7,819,218 B2* | 10/2010 | Eichberger | B60R 19/00 180/274 |
| 8,353,380 B2* | 1/2013 | Schonberger | B60R 19/16 180/274 |
| 8,544,589 B1* | 10/2013 | Rupp | B62D 21/152 180/274 |
| 9,067,617 B2 | 6/2015 | Konchan et al. | |
| 9,120,507 B1* | 9/2015 | Alwan | B62D 21/152 |
| 9,840,282 B2* | 12/2017 | Nusier | B62D 21/155 |
| 2013/0257028 A1* | 10/2013 | Kuwabara | B62D 21/155 280/784 |
| 2014/0091595 A1* | 4/2014 | Ramoutar | B60R 19/24 296/187.09 |
| 2014/0159423 A1* | 6/2014 | Chang | B62D 25/16 296/187.09 |

* cited by examiner

SAFETY DEVICE FOR ORIENTING A MOTOR-VEHICLE FRONT WHEEL TRANSVERSALLY TO THE LONGITUDINAL DIRECTION FOLLOWING A COLLISION

CROSS REFERENCE TO RELATED APPLICATIONS

This application claims priority to European Patent Application No. 16165735.8 filed on Apr. 18, 2016, the entire disclosure of which is incorporated herein by reference.

FIELD OF THE INVENTION

The present invention relates to a safety device for orienting a motor-vehicle front wheel transversally to the longitudinal direction of the motor-vehicle following a collision of the motor-vehicle against a barrier. Devices of this type are being used for the purpose of increasing the degree of safety of the occupants of the motor-vehicle, particularly in the case of a collision with a reduced overlap between the vehicle and the barrier.

PRIOR ART

Document U.S. Pat. No. 9,067,617 B2 discloses a safety device of the above indicated type, comprising a ram-like member carried by the motor-vehicle structure forwardly of a motor-vehicle front wheel. The ram-like member is in a position such that it is pushed against said front wheel of the motor-vehicle following a front collision of the motor-vehicle, thereby inducing a rotation of the wheel towards a position oriented transversally to the travel direction. More in detail, the ram member is configured for perforating the wheel tire and for coming into contact with the wheel rim, forcing it to move in the desired direction. In one of the embodiments shown in the above mentioned prior document (namely in FIGS. 7-9), the above mentioned ram member is carried by a transverse plate projecting in a cantilever fashion laterally from the motor-vehicle structure, so that when it is pushed rearwardly following a collision of the motor-vehicle against the barrier, said transverse plate tends initially to rotate around its end connected to the motor-vehicle structure and brings the ram member to hit the front wheel along a direction inclined with respect to the longitudinal direction of the motor-vehicle, so as to induce a rotation of the wheel towards a position oriented substantially transversally to the longitudinal direction of the motor-vehicle.

In the solution disclosed in U.S. Pat. No. 9,067,617 B2, the ram member is constituted by a rod having one pointed end adapted to hit the front wheel, so as to perforate the tire, until it comes into contact with the wheel rim.

The use of a rod member of this type may however cause an improper, or not totally reliable, operation of the device itself. Also, above all in the case of wheel rims made of light alloy, the risk exists that the shot that is imparted by the rod member against the wheel rim may cause breaking of the rim which renders impossible to induce the desired rotation.

OBJECT OF THE INVENTION

The object of the present invention is that of providing a safety device of the type indicated at the beginning of the present description which has a simple and inexpensive structure and that nevertheless overcomes the above mentioned drawbacks of the known solution.

In particular, an object of the present invention is that of providing a safety device which achieves the purpose of rotating the front wheel of the motor-vehicle towards a position oriented transversally to the travel direction, which is of reliable operation and does not introduces further factors against safety of the occupants of the motor-vehicle.

SUMMARY OF THE INVENTION

In view of achieving the above mentioned object, the present invention provides a motor-vehicle comprising a motor-vehicle structure and a safety device for orienting a motor-vehicle front wheel transversally to a longitudinal direction of said motor-vehicle following a collision of the motor-vehicle against a barrier, said device comprising a ram member carried by the motor-vehicle structure forwardly of a front wheel of the motor-vehicle, at a position such that said ram member is pushed against the motor-vehicle front wheel following a collision of the motor-vehicle against a barrier, wherein said ram member is carried by a transverse plate projecting laterally in a cantilever fashion from the structure of the motor-vehicle, so that when said ram member is pushed rearwardly following a collision of the motor-vehicle against the barrier (W), said transverse plate initially tends to rotate around its end connected to the structure of the motor-vehicle and brings the ram member to hit said front wheel along an inclined direction with respect to said longitudinal direction of the motor-vehicle, so as to induce a rotation of said wheel towards a position oriented transversally to the longitudinal direction of the motor-vehicle, wherein said ram member has a body having a vertically elongated end portion for engagement of the wheel, and wherein with said transverse plate which carries the ram member there is associated a bumper structure arranged forwardly of the transverse plate and comprising a reinforcement element projecting forwardly from said transverse plate, at a position intermediate between said ram member and a connected end of said transverse plate.

In the present invention, the above mentioned ram member has a body having a vertically elongated end portion, for engaging the wheel. This enables the impact force applied by the ram member to be distributed through a relatively large surface when the ram member firstly hits the tire and then the wheel rim. As a consequence of this, the risk of an unexpected behaviour of the wheel or breaking of the wheel rim is significantly reduced, if not nullified at all.

Furthermore, in the device according to the invention with said transverse plate carrying the ram member there is associated a bumper structure located in front of the transverse plate and comprising a reinforcement member projecting forwardly from said transverse plate, at an intermediate position between said ram member and the connected end of said transverse plate.

Due to this feature, the contact between the device and the barrier against which the vehicle collides can be anticipated in time as much as possible, whereas the rotational movement of the transverse plate around its connection to the structure generates a transverse component of the applied force which is useful to induce the rotation of the wheel.

The structure and configuration of the ram member can largely vary, while the main features which have been indicated in the foregoing remain unaltered.

In the preferred embodiment, the front structure of the motor-vehicle comprises two main longitudinal struts and a front cross-member connected to the two main longitudinal struts by two further auxiliary longitudinal struts which are aligned with the two main struts, forwardly thereof. The main struts and the auxiliary struts have their adjacent ends carrying respective front plates which are rigidly connected to each other. The transverse plate carrying the ram member has its connected end interposed in the connection between the plates of the respective main and auxiliary struts.

Preferably, the main struts and/or the auxiliary struts have a hollow structure with a quadrangular cross-section, defined by welded sheet-metal elements, and adapted to deform absorbing energy during the impact.

DETAILED DESCRIPTION OF A PREFERRED EMBODIMENT

Figure 2:
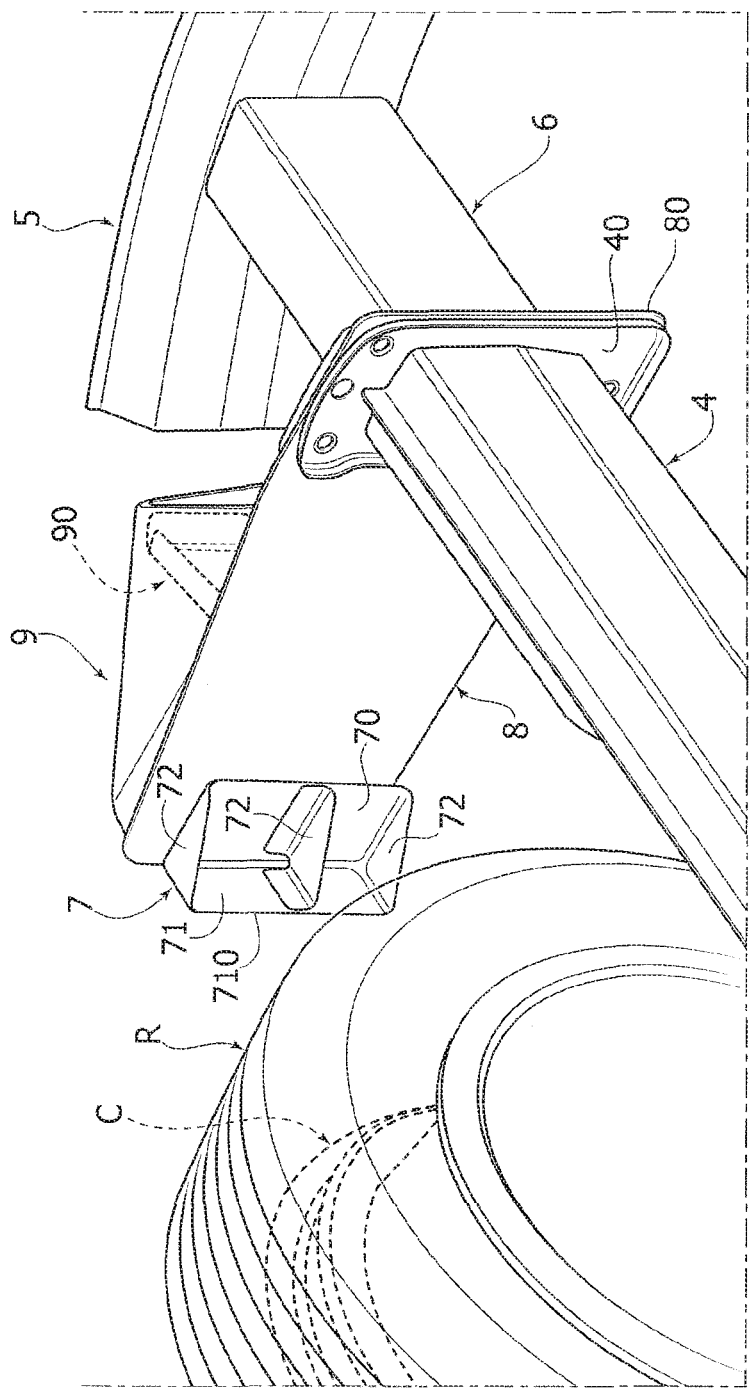
Figure 3:
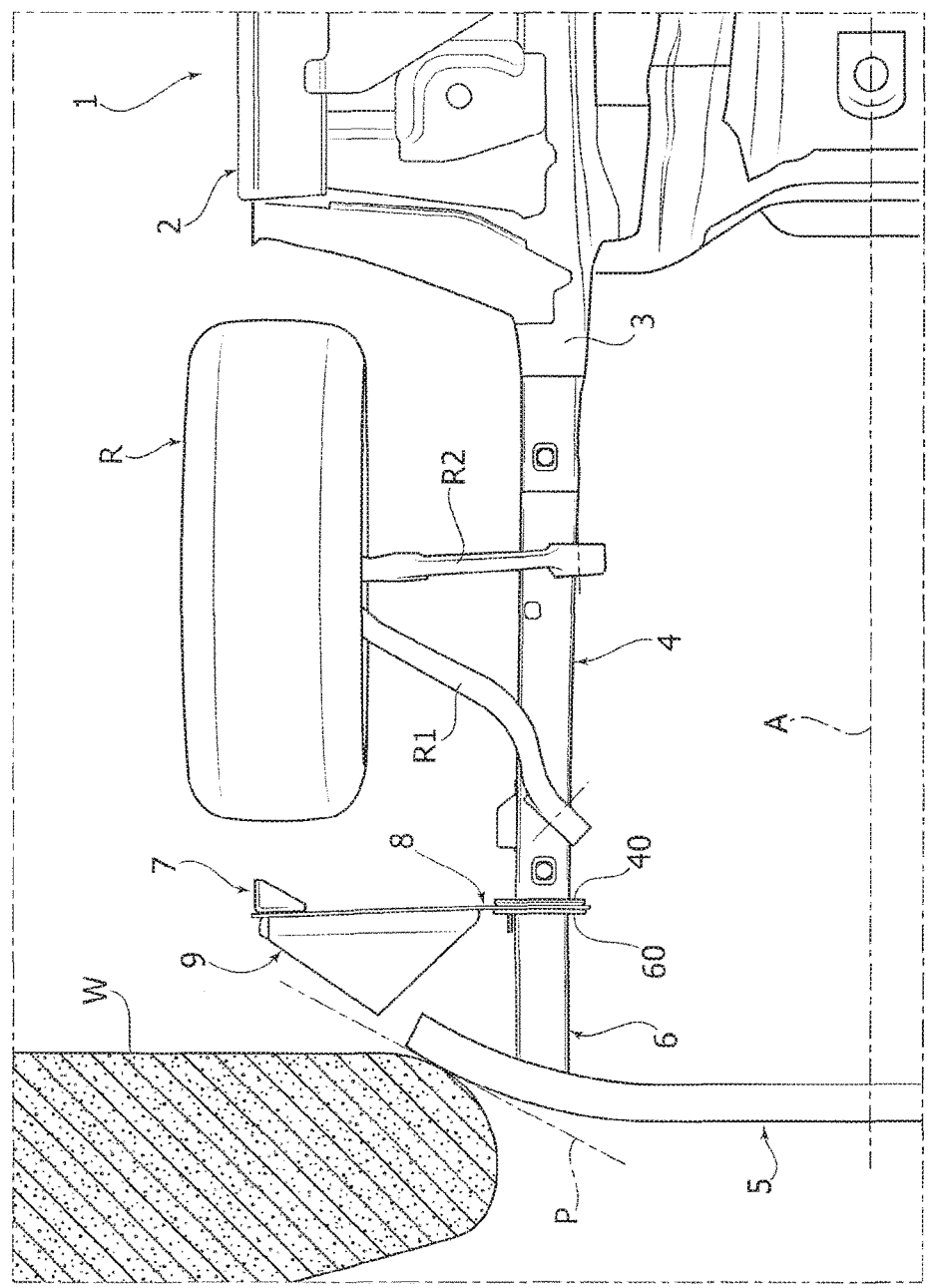
Figure 4:
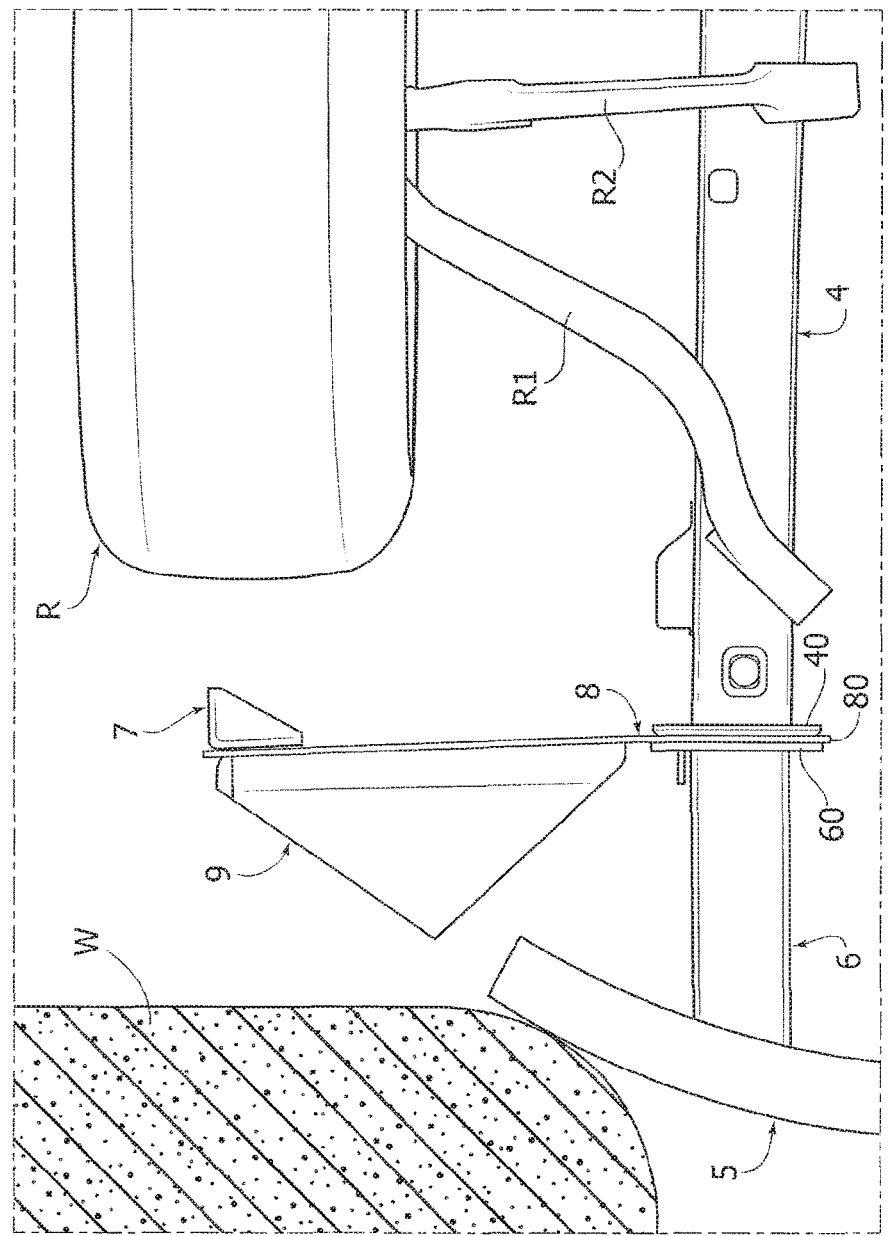
Figure 5:
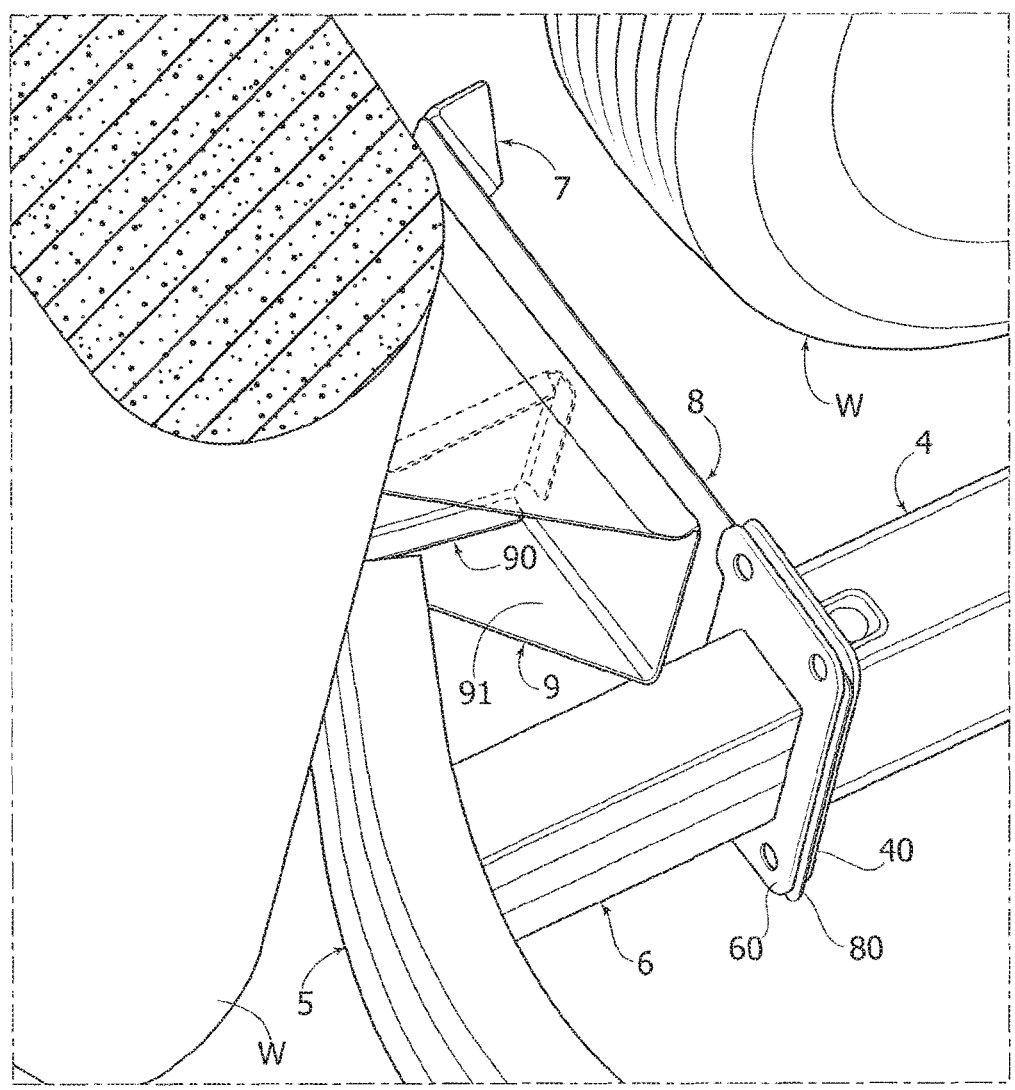

Further features and advantages of the present invention will become apparent from the description which follows with reference to the annexed drawings, given purely by way of non-limiting example, in which:

FIG. 1 is a perspective view of an embodiment of the device according to the invention, FIG. 2 is a further perspective view from below of the device of FIG. 1, FIG. 3 is a view from below of one part of the structure of a motor-vehicle in an initial phase of a collision against the barrier, FIG. 4 is a view at an enlarged scale of a detail of FIG. 3, FIG. 5 is a further perspective view of the detail of FIG. 4, and FIGS. 6 to 10 are plan views which show the subsequent phases of the operation of the safety device according to the invention, following a collision of the motor-vehicle against the barrier.

The annexed drawings show an exemplary application of the device according to the invention to a motor-vehicle having a front structure (generally designated by 1 in FIG. 3) including a floor panel structure 2 made of sheet-metal elements.

FIG. 3 partially shows only the left portion of the motor-vehicle structure, the right portion being identical and symmetrical with respect to the longitudinal vertical plane of the motor-vehicle, represented by axis A. In fact, the device according to the invention may be provided either on the driver's side only, or also on the opposite side. The floor panel structure 2 may have a configuration of any known type. Typically, the floor panel structure 2 includes a pair of main longitudinal beams 3, only one of which is visible in FIG. 3, which extend forwardly with two main longitudinal struts 4, only one of which is visible in this figure. Each of the main longitudinal struts 4 has a front plate 40 at its front end. The front part of the motor-vehicle structure comprises a front cross-member 5 which is rigidly connected to the two main longitudinal struts 4 by two auxiliary longitudinal struts 6 aligned with the two main struts 4. The main struts 4 have front ends carrying front plates 40. The auxiliary struts 6 have rear ends carrying front plates 60 which are rigidly connected, typically by screws, to the respective plates 40 of the main struts 4. The main struts 4 and/or the auxiliary struts 6 preferably have a hollow structure with a quadrangular cross-section, made of sheet-metal elements, so as to be able to be deformed, thereby absorbing energy in the case of a collision of a motor-vehicle.

The annexed drawings show the device according to the invention applied to the left front wheel R, of the motor-vehicle. In a vehicle with a right-hand drive, the device is applied on the right side. However the case is not excluded in which an identical device is provided also on the side opposite to the driver's side. The drawings also diagrammatically show two connecting arms R1,R2 forming part of the suspension of the motor-vehicle, which connect the wheel support (not shown in the drawings) to supports on the motor-vehicle structure (also not shown). For the purpose of the present invention, the specific configuration of the suspension of the motor-vehicle and the configuration and arrangement of the elements which connect the wheel support to the motor-vehicle structure may be of any suitable type. Therefore, the details of construction of the suspension which are disclosed herein are to be considered as given purely by way of non-limiting example.

The safety device according to the invention comprises a ram-like member 7 which is supported at the free end of a transverse plate 8 which projects laterally in a cantilever fashion from the structure 1 of the motor-vehicle.

In the embodiment shown in the annexed drawings (see in particular FIG. 2) the transverse plate 8 has a connected end 80 which is interposed between the front plates 40,60 of a respective pair of a main strut 4 and an auxiliary strut 6.

With reference in particular to FIG. 2, in the illustrated example member 7 has a body of sheet-metal including a first plate 70 connected to the rear face of the transverse plate 8, a second plate 71 arranged orthogonally to the first plate 70 and projecting rearwardly from the transverse plate 8, and a plurality of reinforcement elements 72 welded to the first plate 70 and the second plate 71 so as to connect them rigidly to each other.

As shown for example in FIG. 2, the ram member 7 has a configuration which is elongated in the vertical direction and defining with the free edge of plate 71 a portion 710 for engagement of the wheel R, this portion being also extended vertically. This provides an important difference with respect to the known devices, in which the striking ram member 7 is constituted by a rod with a pointed end, which enters into contact with wheel R at a very reduced area.

Naturally, the configuration of the ram member 7 which is shown in FIG. 2 is given herein purely by way of example. The structure of member 7 may widely vary, while the need remains of defining a portion 710 for engagement of the wheel which has a configuration in form of a vertically elongated edge, with a sharp or rounded profile. The best configuration is selected as a function of the need of maximizing the force transmitted to the rim, in order to induce its rotation.

Also with reference to the drawings (see for example FIGS. 2 and 5), with the transverse plate 8 there is associated a bumper structure 9 located forwardly thereof and including a reinforcement element 90 for maintaining the volume of the structure 9 as much as possible unaltered during the collision. The reinforcement element 90 has a structure (made for example of steel sheet, or aluminium, or high-resistance plastic material) having a front section which is vertically elongated. This element is rigidly connected to the transverse plate 8 at an intermediate position between the ram member 7 and the connected end 80 of plate 8. The bumper structure 9 further comprises a casing 91 (for example of a sheet-metal) which covers the reinforcement element 90; in the illustrated example, this casing has a V-shaped configuration, seen in plan view with two inclined front walls converging towards a front edge which covers the front end of the reinforcement element 90.

With reference to FIGS. 1 and 3, the reinforcement element 90 is arranged transversally further outwardly, and preferably is also vertically spaced apart, with respect to the adjacent end of the front cross-member 5 of the front structure of the motor-vehicle. In this manner, the bumper structure 9 hits directly the wall W against which the vehicle collides.

FIGS. 2 and 6-10 show the operation of the safety device according to the invention during the collision against a barrier W, with a reduced overlap between the vehicle and the barrier. This situation has been reproduced in FIG. 2 by showing a first contact of an end portion of the cross-member 5 with a portion of wall W tangent to a plane P which is not orthogonal to the longitudinal direction of the motor-vehicle.

Figure 6:
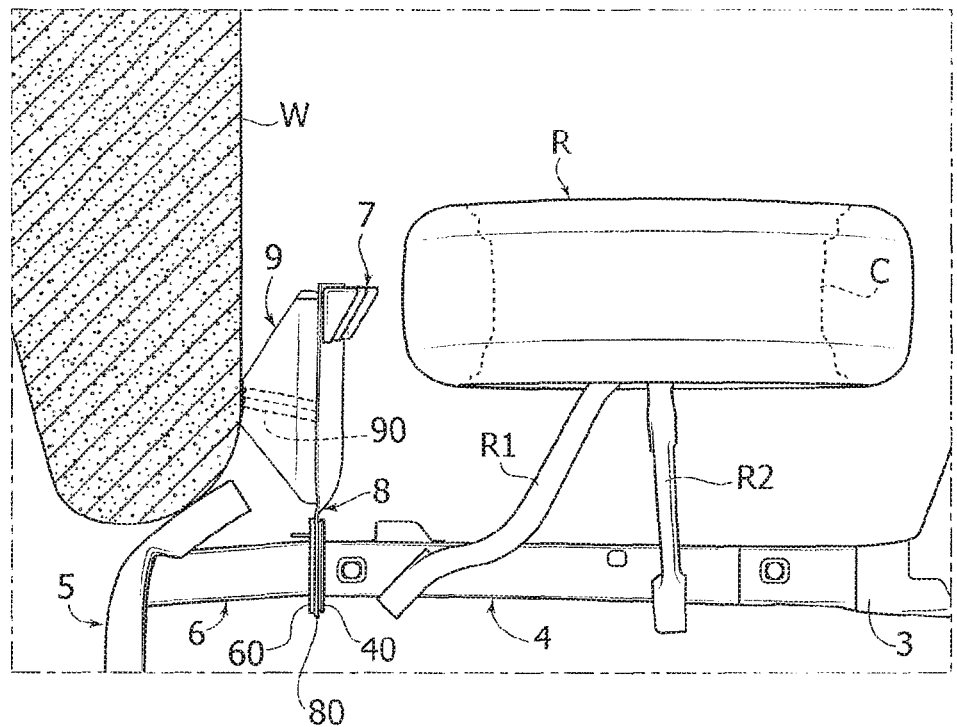
Figure 7:
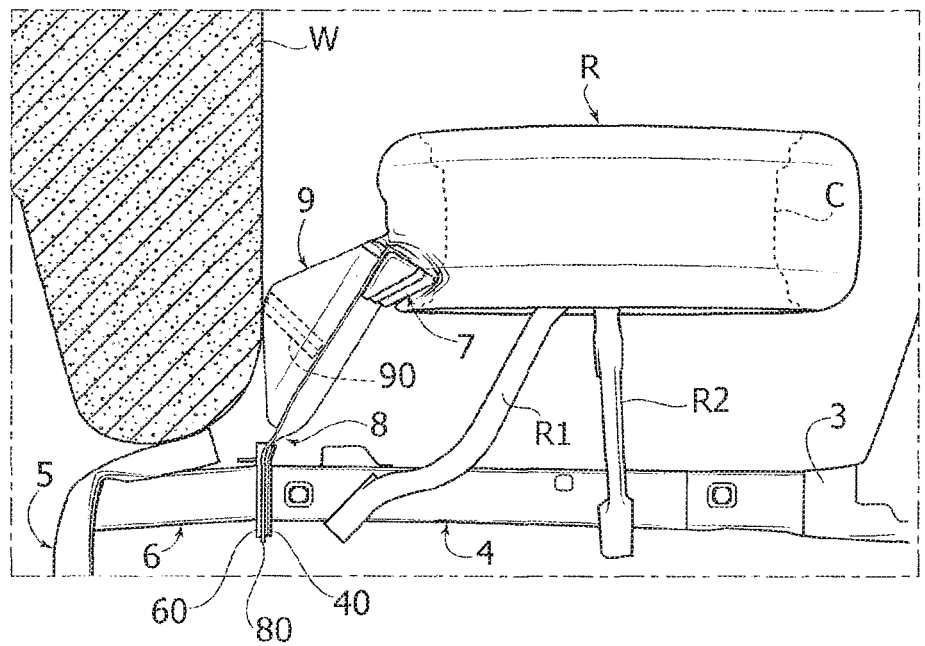
Figure 8:
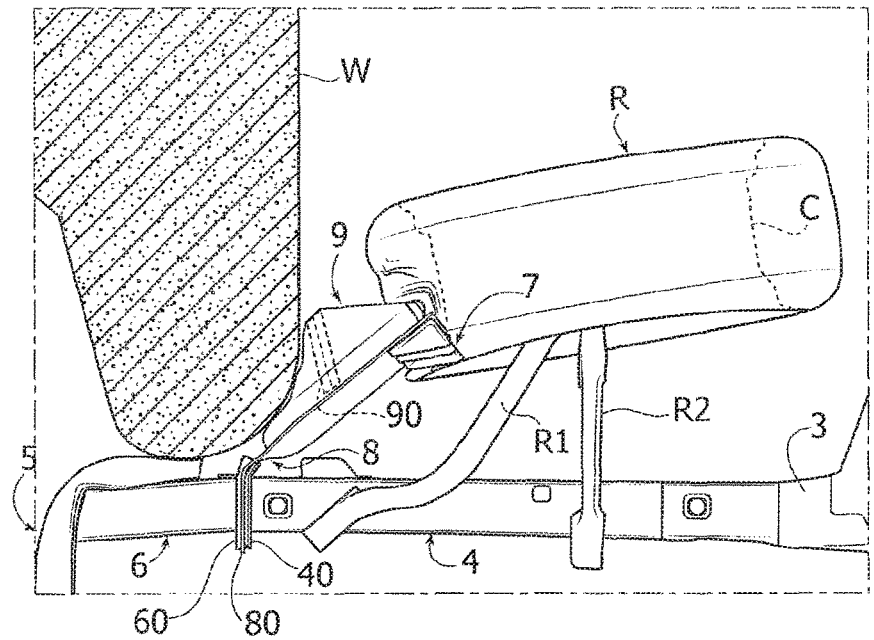
Figure 9:
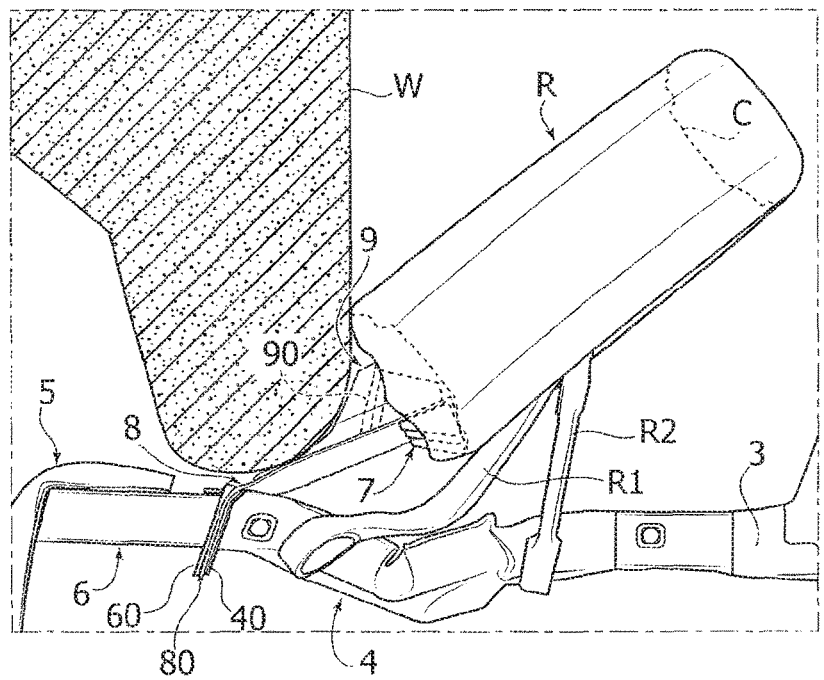
Figure 10:
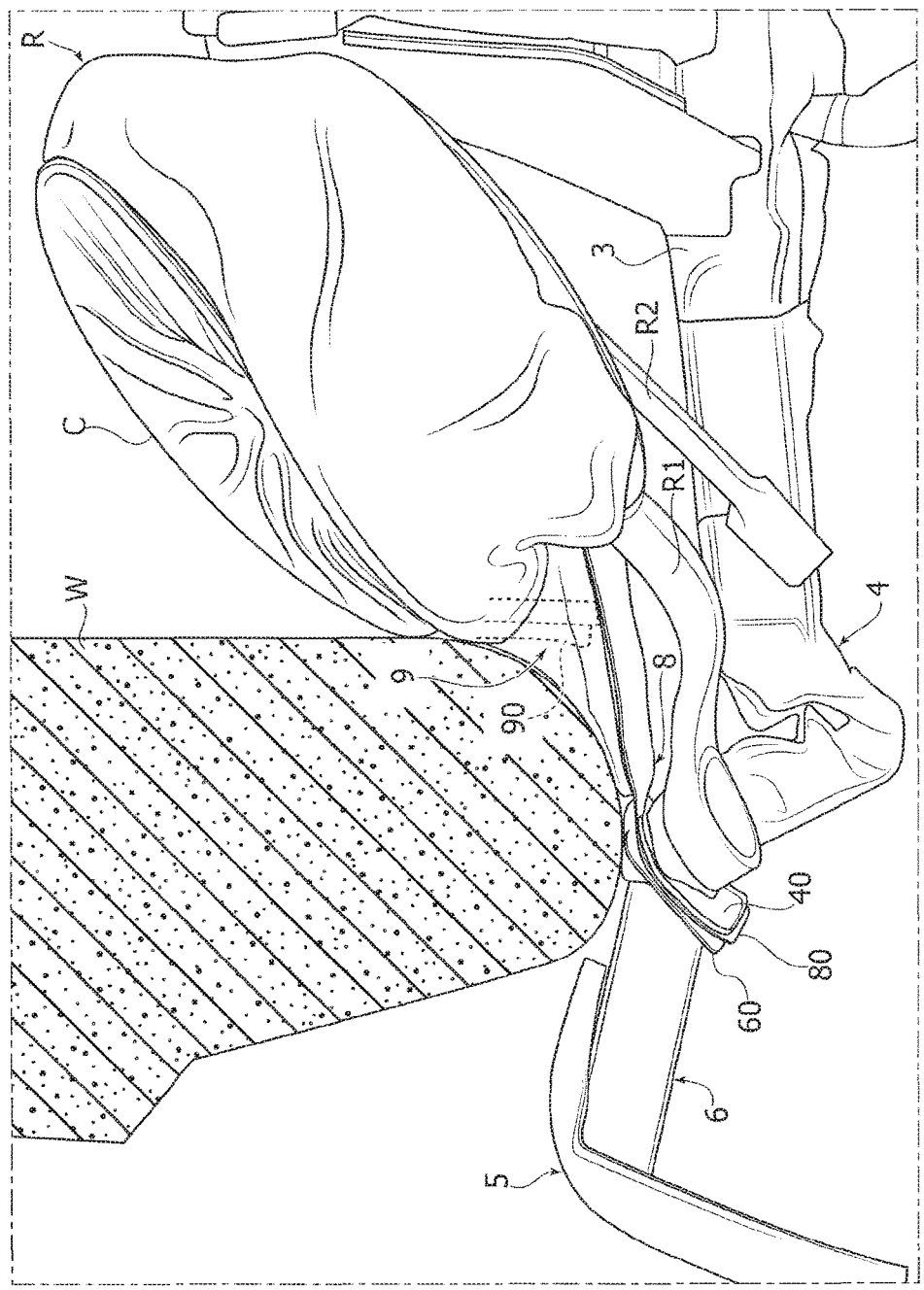

As shown in FIG. 6, immediately after a first contact between the cross-member 5 and wall W also the bumper structure 9 comes into direct contact with the wall W at the front end of the reinforcement element 90. As a consequence of this, the ram member 7 is pushed violently rearwardly, with a simultaneous bending deformation of plate 8 carrying member 7 around its connected end 80. In this manner, the ram member 7 is moved rearwardly by rotating at the same time around the connected end of the transverse plate 8, which brings member 7 to engage wheel R along an inclined direction with respect to the longitudinal direction of the motor-vehicle (FIG. 7). The ram member 7 perforates the tire of the wheel R and comes in contact with the rim C causing it to rotate towards a position oriented transversally with respect to the longitudinal direction of the motor-vehicle, with the front part of the wheel closer to the inner part of the motor-vehicle (FIGS. 8-10). This movement takes place with a simultaneous and permanent deformation of the main strut 4 and the suspension arms R1, R2.

As already described in the foregoing, the ram member 7 has a portion 710 for engagement of the wheel R which is shaped substantially in form of a blade, which defines a surface for a distributed contact with wheel R and in particular with the rim C. In this manner, the risk is substantially reduced, if not totally nullified, that because of the shot imparted by the member 7 the rim C may break.

A further important feature of the invention lies in that with the transverse plate 8 carrying the ram member 7 there is associated a bumper structure 9 with a reinforcement element 90 arranged at an intermediate position between member 7 and the connected end 80 of the transverse plate 8 which carries the ram member 7. In this manner, a more controlled deformation of the transverse plate 8 is obtained along with a multiplied movement of the ram member 7 with respect to the movement of the bumper structure 9 which comes in direct contact with the wall W.

Due to the above mentioned features, the device according to the invention can be adapted to cause an orientation of the wheel in the desired position in the shortest possible time.

Naturally, while the principle of the invention remains the same, the details of construction and the embodiments may widely vary with respect to what has been described and illustrated purely by way of example, without departing from the scope of the present invention.

What is claimed is:

1. A motor-vehicle including a motor-vehicle structure and a safety device for orienting a motor-vehicle front wheel transversally to a longitudinal direction of said motor-vehicle following a collision of the motor-vehicle against a barrier, said device comprising:

a ram member carried by the motor-vehicle structure forwardly of the motor-vehicle front wheel, at a position such that said ram member is pushed against the motor-vehicle front wheel following the collision of the motor-vehicle against the barrier, wherein said ram member is carried by a transverse plate projecting laterally in a cantilever fashion from the motor-vehicle structure, so that when said ram member is pushed rearwardly following the collision of the motor-vehicle against the barrier, said transverse plate initially rotates around its end connected to the motor-vehicle structure and brings the ram member to hit said front wheel along an inclined direction with respect to said longitudinal direction of the motor-vehicle, so as to induce a rotation of said front wheel towards a position oriented transversally to the longitudinal direction of the motor-vehicle, wherein said ram member has a body having a vertically elongated end portion for engagement of the front wheel, and wherein, with said transverse plate which carries the ram member, there is associated a bumper structure arranged forwardly of the transverse plate and comprising a reinforcement element projecting forwardly from said transverse plate, at a position intermediate between said ram member and a connected end of said transverse plate.

2. The motor-vehicle according to claim 1, wherein the motor-vehicle structure includes a front structure comprising two main longitudinal struts and a front cross-member connected to the two main longitudinal struts by two further auxiliary longitudinal struts which are aligned with the two main longitudinal struts and are arranged forwardly thereof, wherein said two main longitudinal struts and said two auxiliary longitudinal struts have adjacent ends carrying respective front plates rigidly connected to each other, wherein the transverse plate carrying the ram member has its connected end interposed between the front plates of a respective main longitudinal strut and an associated auxiliary longitudinal strut.

3. The motor-vehicle according to claim 2, wherein said two main longitudinal struts and said two auxiliary longitudinal struts each have a hollow structure having a quadrangular cross-section defined by welded sheet-metal elements, said hollow structure being adapted to absorb collision energy, in case of a collision, by its permanent deformation.

4. The motor-vehicle according to claim 1, wherein said vertically elongated end portion of the ram member for engagement against the front wheel is in a form of a thin vertical edge.

5. The motor-vehicle according to claim 4, wherein the ram member has a body comprising a first vertical plate secured to a front face of said transverse plate at one end thereof, a second vertical plate orthogonal to said first plate and having a vertical free edge defining said thin vertical edge for engagement against the front wheel, and reinforcement elements which connect said second plate to said first plate.

6. The motor-vehicle according to claim 2, wherein said reinforcement element of the bumper structure is covered by a casing connected to said transverse plate.

7. The motor-vehicle according to claim 6, wherein said casing of the bumper structure has a V-shaped configuration, as seen in plan view, with two inclined front walls converging towards a front vertical edge which covers said reinforcement element of the bumper structure.

8. The motor-vehicle according to claim 6, wherein said reinforcement element of the bumper structure is arranged at a position located transversally further outwardly with respect to an adjacent end of said front cross-member of the front structure of the motor-vehicle.

* * * * *